(12) United States Patent
Kourieh et al.

(10) Patent No.: US 10,477,962 B1
(45) Date of Patent: Nov. 19, 2019

(54) QUICK ASSEMBLY TABLE

(71) Applicant: Millwork Expressions, Inc., Duluth, GA (US)

(72) Inventors: Abboud Gabriel Kourieh, Duluth, GA (US); Jacob Johnson, Duluth, GA (US)

(73) Assignee: Millwork Expressions, Inc., Duluth, GA (US)

( * ) Notice: Subject to any disclaimer, the term of this patent is extended or adjusted under 35 U.S.C. 154(b) by 0 days.

(21) Appl. No.: 16/174,775

(22) Filed: Oct. 30, 2018

(51) Int. Cl.
*A47B 3/06* (2006.01)
*A47B 13/00* (2006.01)
*B60B 33/00* (2006.01)

(52) U.S. Cl.
CPC .............. *A47B 13/003* (2013.01); *A47B 3/06* (2013.01); *A47B 2013/006* (2013.01); *B60B 33/0002* (2013.01)

(58) Field of Classification Search
CPC ...... A47B 13/003; A47B 13/021; A47B 13/06
See application file for complete search history.

(56) References Cited

U.S. PATENT DOCUMENTS

| | | | | |
|---|---|---|---|---|
| 4,011,821 A | * | 3/1977 | Neal | A47B 3/12 108/156 |
| 8,671,644 B2 | * | 3/2014 | Huang | A47B 13/06 108/155 |
| 2005/0066862 A1 | * | 3/2005 | Choi | A47B 13/021 108/155 |
| 2007/0261614 A1 | * | 11/2007 | Weissenrieder | A47B 13/003 108/158.12 |
| 2017/0156486 A1 | * | 6/2017 | Blick | A47B 3/06 |

FOREIGN PATENT DOCUMENTS

| | | | | |
|---|---|---|---|---|
| DE | 3808087 C1 | * | 10/1989 | ........... A47B 13/021 |
| DE | 29918352 U1 | * | 2/2000 | ............ A47B 13/06 |
| DE | 202016000783 U1 | * | 6/2016 | ............ A47B 13/06 |
| EP | 0628735 A1 | * | 12/1994 | ........... A47B 13/021 |
| FR | 2201730 A5 | * | 4/1974 | ............ A47B 13/06 |
| GB | 1243093 A | * | 8/1971 | ............ A47B 13/06 |

* cited by examiner

*Primary Examiner* — Matthew W Ing
(74) *Attorney, Agent, or Firm* — Hill, Kertscher & Wharton, LLP; Gregory T. Ourada

(57) ABSTRACT

A table disclosed herein features a horizontal surface, and at least two a supporting trusses designed to be quickly attached and fastened to a horizontal surface, is disclosed and claimed herein.

3 Claims, 2 Drawing Sheets

QUICK ASSEMBLY TABLE

FIELD OF THE INVENTION

The field of the invention relates to tables, namely, quick assembly tables.

BACKGROUND OF THE INVENTION

The problem addressed by the inventive embodiments disclosed herein is how to easily manufacture a sturdy table that can be transported using a "flat pack" configuration, yet which is easily assembled. Current designs feature tables with hinged legs that fold out for assembly, or legs which are detached and then have to be installed. The disadvantages of these design are that, in the former case, the legs are often either not sturdy, or the hinging mechanism may be too complex for a heavy-duty table; or, in the latter case, assembly is somewhat time consuming and the supporting legs are also not structurally as sound as they could be.

BRIEF SUMMARY OF THE INVENTION

The inventive embodiments disclosed herein involve a heavy-duty table suitable for a wide variety of uses that can be shipped in a flat-pack configuration, contains minimal and that is easy to assemble. Preferred embodiments of the invention employ welded hollow tubing for supporting structure.

DETAILED DESCRIPTION OF THE INVENTION

The invention is described in preferred embodiments in the following description with reference to the Figures, in which like numbers represent the same or similar elements. Reference throughout this specification to "one embodiment", "an embodiment", or similar language means that particular feature, structure, or characteristic described in connection with the embodiment is included in at least one embodiment of the present invention. Thus, appearances of the phrases "in one embodiment", "in an embodiment", "in certain embodiments", and similar language throughout this specification may, but do not necessarily, all refer to the same embodiment. It is noted that, as used in this description, the singular forms "a", "an", and "the" include plural referents unless the context clearly dictates otherwise.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention may be understood more readily by reference to the following detailed description of the invention taken in connection with the accompanying drawing figures, which form a part of this disclosure. It is to be understood that this invention is not limited to the specific devices, methods, conditions, or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Figure 1:
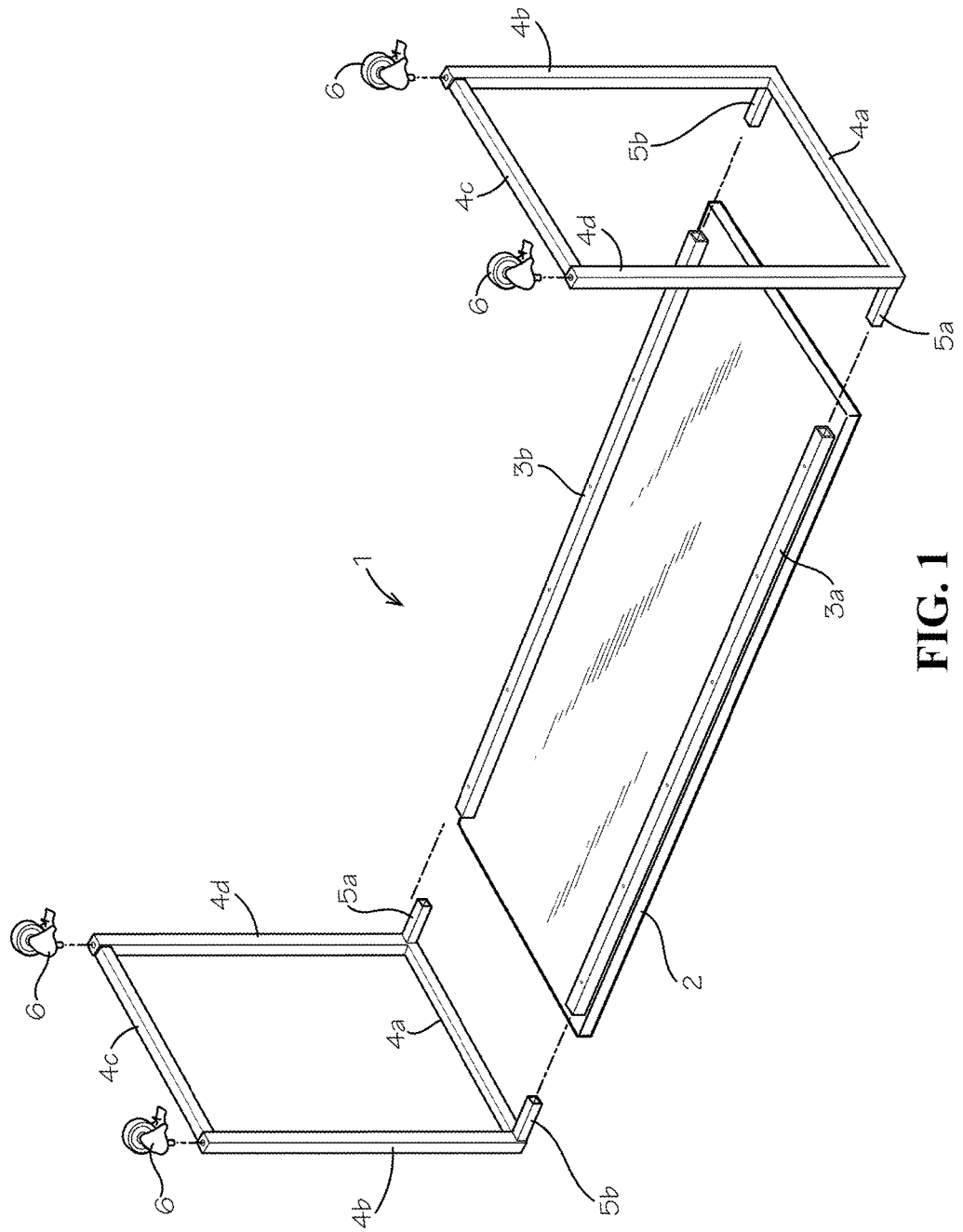
FIG. 1 is an exploded perspective view of a preferred embodiment of the invention.
Figure 2:
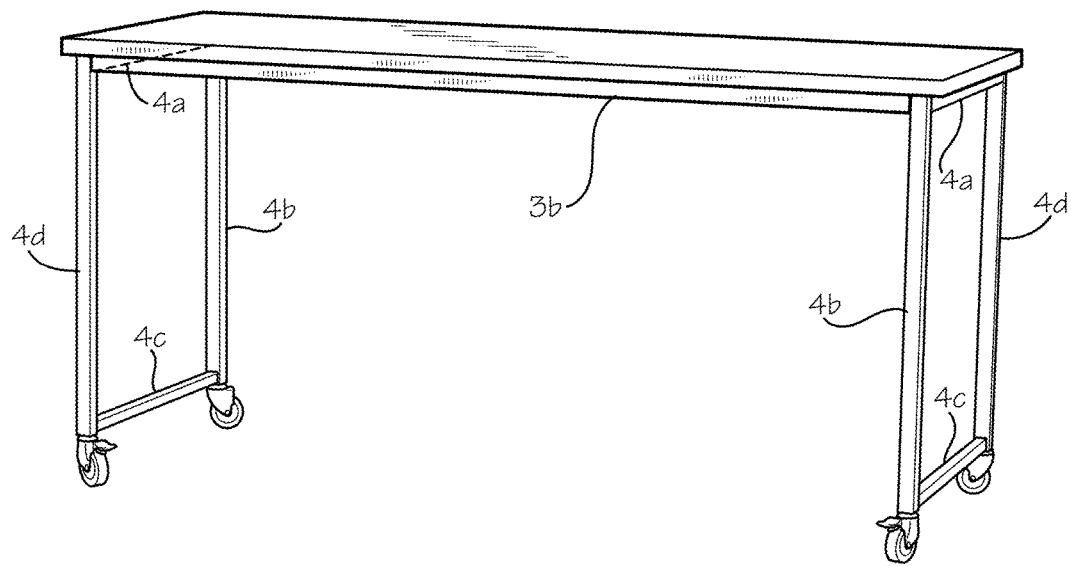
FIG. 2 is a perspective view of a preferred embodiment of the invention.
Figure 3:
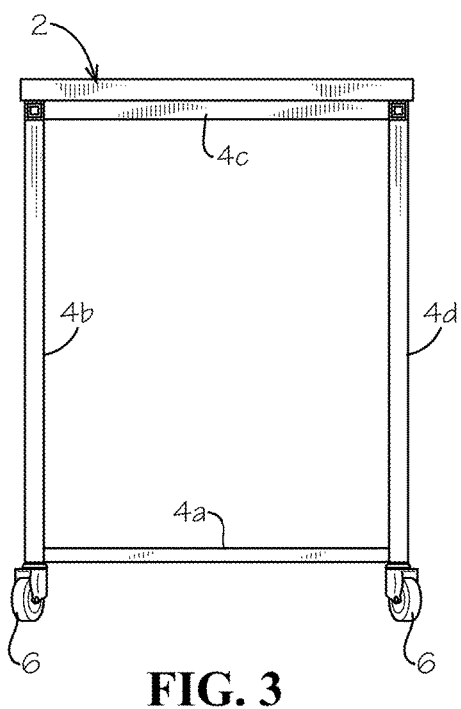
FIG. 3 is a profile view of a preferred embodiment of the invention.

FIG. 1 shows a preferred embodiment of the inventive concept in an exploded perspective view. Table 1 is comprised of 3 primary parts: table surface 2, and two identical supporting trusses consisting of top and bottom horizontal truss members 4a, and 4c, respectively, and left and right vertical truss members 4b, 4d Table surface 2 is typically composed of a wood product such as particleboard covered with a laminate such as melamine, although either pure hard or softwoods or a metal such as stainless steel may be used depending on the intended application. As can be clearly seen in FIG. 1, the supporting trusses are comprised of the horizontal and vertical truss members, 4a, 4b, 4c, and 4d arranged in coplanar fashion perpendicular to the adjoining members and joined to each other at their edges, preferably by welding. Insertable posts 5a and 5b are attached (again, preferably by welding) and extend perpendicularly from the supporting trusses. These insertable posts 5a and 5b are configured so that they can easily be inserted into a channel defined by the cross section of left and right brace members 3a, 3b.

Horizontal and vertical truss members 4a, 4b, 4c, and 4d, and left and right brace members 3a, 3b are hollow metal tubes having a square cross section in the preferred embodiment disclosed by FIG. 1. Consequently, insertable posts 5a and 5b are also square in cross section, although these members are usually solid, i.e. they do not feature a hollow cross-sectional shape. Finally, in the embodiment shown in FIG. 1, wheels 6 are attached to the open ends of vertical truss members 4b and 4d.

When being shipped, the supporting trusses and table surface 2 are shipped in "flat pack" with supporting trusses laying on top of table surface 2 with insertable posts 5a and 5b oriented toward table surface 2 and overlapping slightly so that the overall height of the stacked components is minimized. After being unpacked, assembly typically takes less than five minutes. Table surface 2 is laid with its top surface on the floor so that its underside is facing upward along with left and right brace members 3a and 3b. Insertable posts 5a and 5b of supporting trusses are then inserted into the ends of left and right brace members 3a and 3b. The top supporting truss member 4a is secured in place by emplacing wood screws through pre-dilled holds in truss member 4a into the underside of table surface 2. Finally, machine screws are screwed into pre-drilled holes in brace members 3a, 3b and insertable posts 5a and 5b.

While the invention has been described with reference to preferred and example embodiments, it will be understood by those skilled in the art that a variety of modifications, additions, and deletions are within the scope of the invention, as defined by the following claims.

What is claimed is:

1. A table, comprising:
   a horizontal surface with tubular brace members attached thereto;

two or more supporting trusses, each supporting truss comprising a plurality of tubular metal truss members disposed in a planar configuration, said tubular truss members being joined by welding at their abutting ends, and insertable posts welded perpendicularly to said tubular metal truss members, wherein said insertable posts are adapted for insertion into said tubular brace members.

2. A method of producing a quick-assembly table, comprising the steps of:
- creating a first and second preassembled component, each preassembled component comprising a planar supporting truss formed by welding a plurality of tubular truss members at their abutting ends;
- welding insertable posts perpendicular to said supporting truss;
- attaching a set of tubular brace members to the underside of a horizontal surface, said tubular brace members adapted to accommodate the insertion of said insertable posts.

3. A quick-assembly table, comprising:
- a first preassembled component comprising a horizontal surface and one or more tubular brace members attached to said horizontal surface;
- a second and third preassembled component, each comprising:
  - a plurality of members welded together at their abutting ends to form a planar truss, said planar truss having insertable posts extending perpendicularly to said planar truss and welded thereto, wherein said insertable posts are adapted to be inserted into the open ends of said tubular brace members.

* * * * *